UNITED STATES PATENT OFFICE.

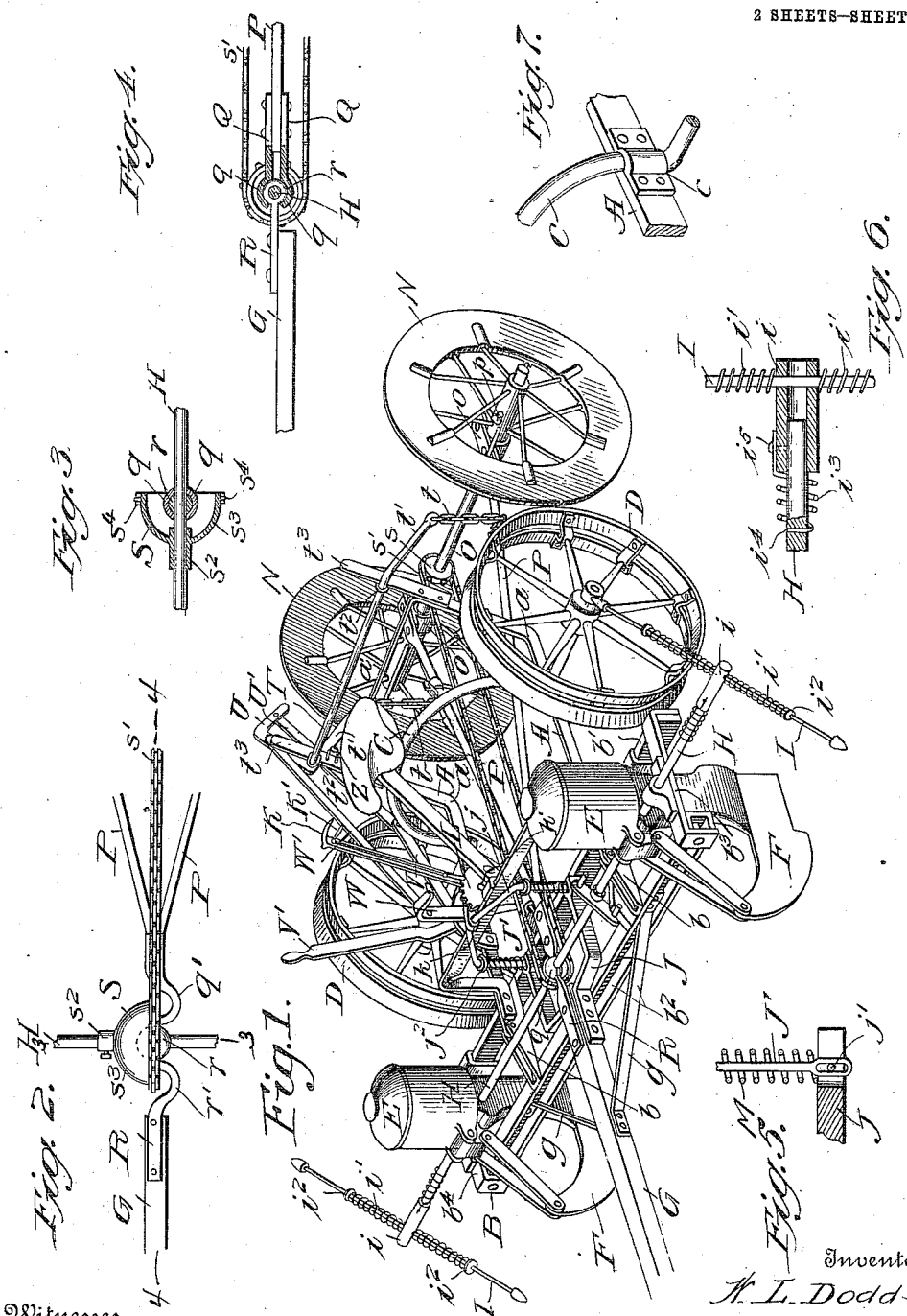

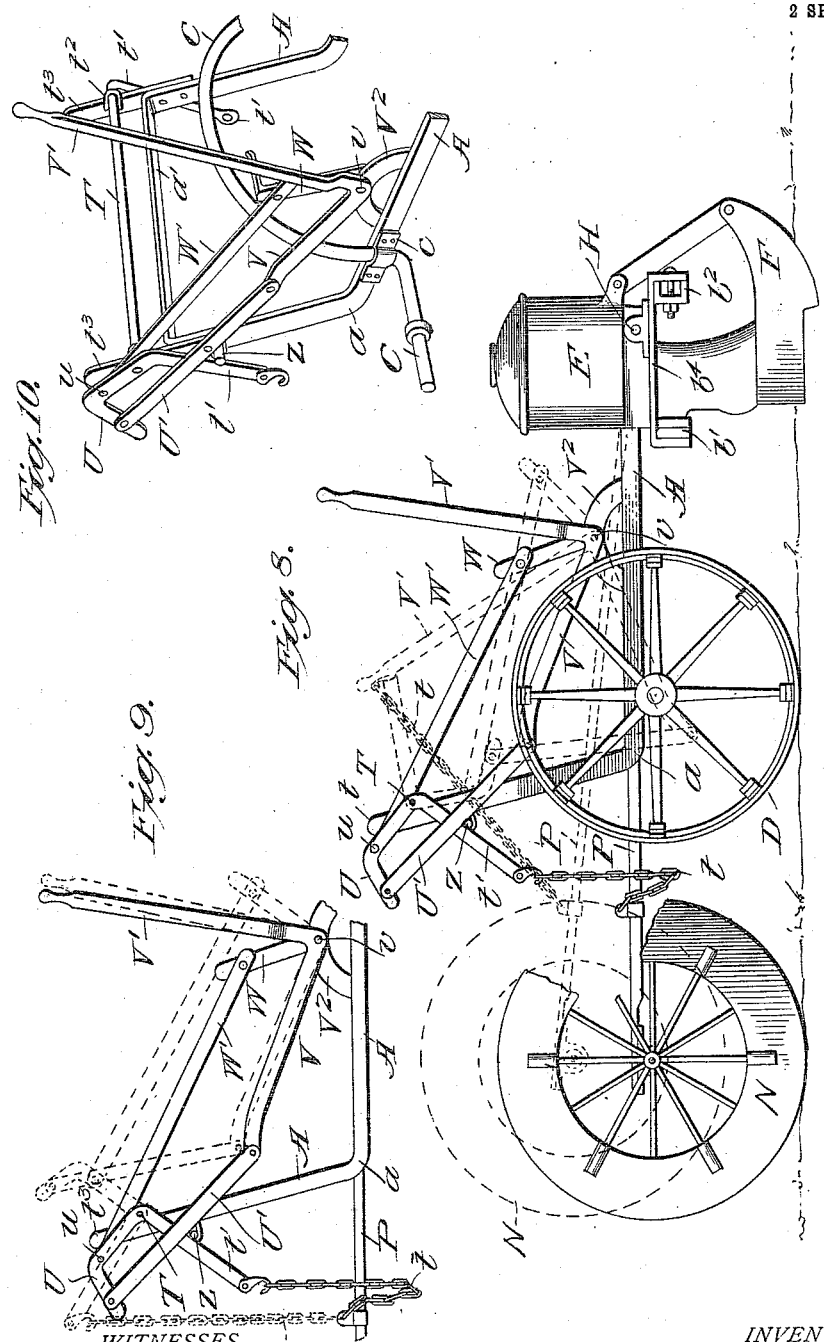

WALTER L. DODD, OF WESTVILLE, INDIANA.

SEED-PLANTER.

985,331.  Specification of Letters Patent.  Patented Feb. 28, 1911.

Application filed October 1, 1910. Serial No. 584,809.

*To all whom it may concern:*

Be it known that I, WALTER L. DODD, a citizen of the United States, residing in Westville, in the county of Laporte and State of Indiana, have invented certain new and useful Improvements in Seed-Planters, of which the following is a specification.

My invention relates to the kind of seed planters shown in my U. S. Patent No. 916,539 of Mar. 30, 1909, and the object of my invention is to improve planters of this kind and render them more reliable in operation and more easily managed.

In carrying out my invention, I provide a main frame which is supported on the main axle and on the frame of the shoes, runners or furrow openers in advance of the carrying wheels. The seed boxes are supported on the runner frame and the seed is fed by a shaft carrying on its outer end markers of the kind shown in the aforesaid patent, such shaft being driven by gearing connecting it with a shaft in rear of the marker shaft which carries disks or wheels adjustable to run in the paths of the main carrying wheel or to one side thereof. This last-named shaft is supported in an auxiliary frame which can be raised and lowered to lift the disks or wheels off the ground or to lower them thereto. In general construction my improved planter is therefore similar to that shown in the aforesaid patent, but the auxiliary frame to which the disks are connected is connected at its front end with the tongue of the machine in a novel way. The disks are driven by improved gearing, and the markers are connected to the marker shaft by new devices. The improved machine also has new mechanism for lifting and lowering the disks and novel devices for raising and lowering the runners.

In the accompanying drawings:—Figure 1 is a perspective view of my improved machine. Fig. 2 is a detail top plan view showing how the auxiliary frame is connected to the tongue and how the marker shaft is driven from the shaft carrying the disks. Fig. 3 is a detail view in section on the line 3—3 of Fig. 2. Fig. 4 is a detail view in section on the line 4—4 of Fig. 2. Fig. 5 is a detail view of part of the devices for lifting the shoes or runners from the ground. Fig. 6 is a sectional detail view showing how the marker arms shown in Fig. 1 are connected with the marker shaft. Fig. 7 is a detail view showing how the main axle is connected with the main frame. Fig. 8 shows a side elevation of the machine, the disk-elevating mechanism being shown by full lines as it appears when the disks are lowered, while dotted lines show the position of the disks and the disk elevating mechanism when the disks are elevated. Fig. 9 is a view in side elevation of the disk elevating mechanism, full lines showing the position of this mechanism when the disks are on the ground and dotted lines showing the position of the mechanism when the lifting chains are drawn tight and the mechanism is in position to be further moved to lift the disks. Fig. 10 is a perspective view of the lifting devices.

The main frame is shown as consisting of two parallel bars A on opposite sides of the planter, connected at their front ends to brackets $b$ on the shoe-carrying frame B. The bars A are bent at $a$ and extended upwardly and rearwardly and are connected at the top by a cross bar $a'$. The main axle C is arch shaped and is arranged as shown, and is connected on opposite sides to the frame bars A at $c$ in any approved way, one way being shown in Figs. 7 and 10. The main or carrying wheels D are journaled on opposite ends of the axle C and are of usual construction.

The seed boxes E are supported on the runner frame B which consists of two parallel cross bars $b'$, $b^2$, which may be of channel iron, and end connected bars $b^3$, $b^4$. The shoes or runners F are connected to the runner frame in the usual way, and the tongue G is connected to this frame by braces, $g$. The marker shaft H extends below the seed boxes, as in the previous patent, and it carries on its outer ends marker arms I, similar to those shown in said patent. As indicated in Fig. 6 each pair of arms is formed of a single rod which extends through a hub or sleeve $i$ and springs $i'$ are interposed between the sleeve or hub and collars $i^2$, as in the before-mentioned patent and as also shown in U. S. Patent No. 765,130 of July 12, 1904.

According to my present invention the sleeve on each end of the marker shaft instead of being rigidly connected to the shaft is connected thereto by a spring $i^3$, which spring is secured at $i^4$ to the shaft and is attached at $i^5$ to the hub $i$, as clearly shown in Fig. 6. By this arrangement while the springs are sufficient to hold the arms in position they will yield when any unusual obstruction is encountered and thus avoid injury to the markers.

The tongue G is provided at its rear end with a bifurcated frame J, from the arms of which extend upwardly rods J' which are formed with inwardly extending arms $j$ connected with the arm $k$ of a bell crank lever K pivoted at $k'$ to the segment L. The lever K is provided with detent devices K' engaging the segment. By operating the lever K the shoes or runners may be raised and lowered. The rods, J', as shown in Fig. 5, extend through slots in the arms J and have a slot-and-pin connection $j'$ with these arms. Springs M are interposed between the arms J and collars $J^2$ secured to the rods J' near their upper ends. These springs serve to hold the runners down to their work.

The disks N are attached to a shaft O mounted to revolve in bearings $o$ on the rear ends of the auxiliary frame P which is V-shaped, as shown, and consists of two bars converging at their front ends and at their rear ends being arranged near the disks N. The hubs of the disks are adjustably secured to the disk-shaft O by set screws $p$ or they may be secured thereto in other ways in order that the disks may be placed to run immediately behind the carrying wheels or to one side thereof. The front end of the auxiliary frame P is connected directly with the tongue in the manner illustrated in detail in Figs. 2, 3 and 4. As there shown the tongue has secured to it a plate R, carrying a ball $r$ through which the marker-shaft H extends and the auxiliary frame P carries two plates Q having concaved extensions $q$ which embrace the ball. In this way a ball-and-socket connection is made between the tongue and the auxiliary frame, and this connection is directly in the central line of draft. The marker-shaft is connected with the disk axle by sprocket gearing comprising a sprocket wheel $s$ on the disk-shaft, a sprocket chain $s'$ and a sprocket wheel S on the marker-shaft. The sprocket wheel S is of novel form. As shown, it is cup-shaped comprising a hub $s^2$ attached to the marker-shaft and a cup-shaped body portion $s^3$ which is provided with an annular series of teeth $s^4$ with which the chain $s'$ gears. The teeth $s^4$ are in the central line of draft so that no matter which way the planter turns the chain will be taut and the gearing complete.

As illustrated in Fig. 2 the rear portion $r'$ of the plate R which connects with the ball $r$ is bent in order to allow the cup-shaped sprocket wheel to hold its teeth directly in the central line of draft, and the plates P are correspondingly bent at $q'$ for a similar purpose.

In order to suspend the seed-dropping operation when going to and from the field, when turning the machine and at some other times, I have provided improved means for raising the disks N from the ground. In the former patent I described a machine having mechanism for this purpose but I have improved the mechanism, and as shown the auxiliary frame is connected by chains $t$ with the downwardly and rearwardly extending arms $t'$ of a rock shaft T which is mounted to turn in bearings $t^2$ on arms $t^3$ extending up from the frame bars A. The rock shaft T carries an angle lever U which extends upwardly and rearwardly from the rock shaft and then rearwardly and downwardly, its upper rear end being connected by a link U' with the rear end of a lever V which is rigidly connected with a hand lever V', both levers being connected at $v$ to a bracket $V^2$ attached to the main frame A. A foot lever W, pivotally connected with the bracket $V^2$ and movable independently of the levers V and V' is connected by a link W' with the lever U at $u$. When the disks are on the ground the parts of the lifting mechanism are in the position shown by full lines in Figs. 8, 9 and 10, the chains $t$ being slack and the arms $t'$ resting on stops Z attached to the main frame A. When it is desired to raise the disks, the driver first pushes forward the foot lever W to the position shown by dotted lines in Fig. 9 and the various parts of the lifting mechanism then assume the positions shown by dotted lines in Fig. 9. While still keeping his foot on the foot lever, the driver then pulls back on the hand lever V', moving it to the position shown by dotted lines in Fig. 8 and the various parts will then assume the positions shown by dotted lines in Fig. 8, the disks being elevated and the joints of the connection being in such positions that the disks are held in their elevated positions without the use of detent mechanism. As long as the hand lever is in the position shown in Fig. 8 the disks will be held elevated and the actuation of the marker-shaft and the seed-dropping mechanism will be suspended. When it is desired to lower the disks, the driver pushes forward on the foot lever which will have the effect of raising the arms $t'$ and lifting the link U' to such a degree that the joints are unlocked and the disks will drop by their own weight.

The mechanism herein described has been put into actual practice and operates efficiently.

I claim as my invention:

1. A seed planter, comprising a main frame, main carrying wheels connected therewith, a runner frame, a tongue, connections between the runner frame and the tongue, an operating lever for the runner frame, a bifurcated frame attached to the tongue, and yielding connections between this frame and the operating lever.

2. The combination of the main frame, the runner frame, the tongue connected with the runner frame, a marker shaft mounted in bearings on the runner frame, an auxiliary frame, a disk shaft supported in bearings in this frame, and a ball-and-socket connection between the auxiliary frame and the tongue.

3. The combination with the tongue of an auxiliary frame having a ball-and-socket connection therewith in the central line of draft, a disk shaft mounted in bearings at the rear ends of the auxiliary frame, disks carried by this shaft, a marker shaft and gearing connecting the disk shaft with the marker shaft.

4. The combination with the tongue of an auxiliary frame, a disk shaft mounted in bearings therein, a hinged connection between the auxiliary frame and the tongue arranged in the central line of draft, the marker shaft, and sprocket gearing arranged in the central line of draft connecting the disk shaft with the marker shaft.

5. The combination with the tongue of the main frame, the runner frame with which it is connected, an auxiliary frame having a hinged connection with the tongue, disks carried by the disk shaft, a marker shaft, a cup-shaped sprocket wheel attached to the marker shaft and having its teeth in the central line of draft, and sprocket gearing connecting said sprocket wheel with the disk shaft.

6. The combination of the main frame, the auxiliary frame, the disk shaft mounted in bearings on the auxiliary frame, the rock shaft connected with the auxiliary frame, the foot lever having connections with said rock shaft, and the hand lever having connections with said rock shaft whereby said rock shaft may be turned to raise and lower the auxiliary frame.

7. The combination of the main frame, the auxiliary frame, the disk shaft mounted in the auxiliary frame, a rock shaft mounted to turn in bearings in the main frame, arms projecting from this rock shaft and connected with the auxiliary frame, an angle lever carried by the rock shaft, a foot lever connected with the angle lever, a hand lever having a rearwardly extending arm, and a link connecttion between this arm and the angle lever.

In testimony whereof, I have hereunto subscribed my name.

WALTER L. DODD.

Witnesses:
WILLIAM E. TOPPER,
B. B. BARNARD.

---

Copies of this patent may be obtained for five cents each, by addressing the "Commissioner of Patents, Washington, D. C."